US007034485B2

(12) United States Patent
Kuan et al.

(10) Patent No.: US 7,034,485 B2
(45) Date of Patent: Apr. 25, 2006

(54) VEHICLE LIFTGATE CONTROL SYSTEM

(75) Inventors: Chihping Kuan, Rochester Hills, MI (US); Joseph Benjamin Saxon, Cookeville, TN (US); Shelley Lynn Bolbrugge, Royal Oak, MI (US); Adam Kyle Cramton, Royal Oak, MI (US); Enrico Fin, Lake Orion, MI (US); Jack R. Roach, Florence, SC (US); Karim Dayoub, Royal Oak, MI (US); Walter Douglas Bauman, Wixom, MI (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/948,908

(22) Filed: Sep. 24, 2004

(65) Prior Publication Data

US 2006/0066278 A1 Mar. 30, 2006

(51) Int. Cl.
*H02P 1/00* (2006.01)
*H02P 1/04* (2006.01)
*G60J 5/10* (2006.01)

(52) U.S. Cl. ........................ 318/466; 318/460; 49/324; 296/146.4

(58) Field of Classification Search ................ 318/283, 318/286, 266, 466, 468; 49/324, 340, 26, 49/280, 349, 353; 296/146.8, 146.4
See application file for complete search history.

(56) References Cited

U.S. PATENT DOCUMENTS

| | | | |
|---|---|---|---|
| 5,531,498 | A * | 7/1996 | Kowall .................... 296/146.4 |
| 5,872,344 | A | 2/1999 | Durand et al. |
| 5,909,921 | A | 6/1999 | Nesbeth |
| 5,921,604 | A | 7/1999 | Yu et al. |
| 5,960,519 | A | 10/1999 | Thompson et al. |
| 6,054,783 | A | 4/2000 | Philipp et al. |
| 6,135,536 | A | 10/2000 | Ciavaglia et al. |
| 6,150,740 | A | 11/2000 | Slocum |
| 6,220,649 | B1 * | 4/2001 | Rife ...................... 296/146.12 |
| 6,293,050 | B1 * | 9/2001 | Johnk .......................... 49/276 |
| 6,398,288 | B1 * | 6/2002 | Yuge ....................... 296/146.4 |
| 6,557,924 | B1 * | 5/2003 | Lauderbach et al. ..... 296/146.4 |
| 6,600,285 | B1 * | 7/2003 | Mintgen et al. ............ 318/468 |
| RE38,400 | E * | 1/2004 | Kowall et al. .............. 318/283 |
| 6,799,790 | B1 * | 10/2004 | Sakai et al. .............. 296/146.8 |
| 2002/0069753 | A1 | 6/2002 | Lauderbach et al. |
| 2002/0174604 | A1 * | 11/2002 | Lauderbach et al. .......... 49/324 |
| 2003/0146644 | A1 * | 8/2003 | Sakai et al. .............. 296/146.8 |

FOREIGN PATENT DOCUMENTS

| | | |
|---|---|---|
| DE | 2920750 | 11/1979 |
| DE | 29722952 | 7/1998 |
| EP | 1072747 | 1/2001 |

* cited by examiner

*Primary Examiner*—Paul Ip
(74) *Attorney, Agent, or Firm*—Carlson, Gaskey & Olds

(57) ABSTRACT

A powered system to selectively position a vehicle liftgate at a multiple of positions intermediate a fully open and a fully closed position. A controller receives commands from a remote, such as a key fob, and/or from a selector located within the vehicle to selectively operate the liftgate to move the liftgate through a multiple of liftgate positions through a combination of button presses or selector positions.

17 Claims, 2 Drawing Sheets

VEHICLE LIFTGATE CONTROL SYSTEM

BACKGROUND OF THE INVENTION

The present invention relates to a vehicle liftgate and, more particularly, to a control system therefor.

Vans, station wagons, pick-ups, and sport-utility vehicles (SUVs) typically have rear doors, generically called tailgates, which provide access to the vehicle's rear cargo area through a rear opening. In some vehicles, pairs of doors are vertically hinged at the sides of the rear opening to open horizontally. In others, pairs of doors are horizontally hinged at the top and bottom of the rear opening to open vertically up and down like a clamshell. In yet other vehicles, a single door or liftgate is horizontally hinged at the top of the opening to open upwardly.

Liftgates are usually fitted with cylindrical devices filled with pressurized gas at the sides to provide a spring assist when the door is raised. These cylindrical devices are commonly referred to as gas springs, gas struts, gas props, gas stays, or stay dampers. Manual effort may be required to both raise and lower the liftgate even though the gas springs aid lifting and gravity aids lowering. Manual operation necessitates operator presence at the liftgate for operation, which may be undesirable during inclement weather and may be difficult for some people.

Many vehicles are currently incorporating powered actuators to automatically open and close the liftgates. Although effective, the powered actuators operate generally in accordance with the manual systems. As with manual systems, the powered actuators move the liftgate between a fully open and a fully closed position.

Accordingly, it is desirable to provide a control system that selectively positions a vehicle liftgate.

SUMMARY OF THE INVENTION

The control system according to the present invention provides a powered actuator to selectively operate a vehicle liftgate. A controller receives commands from a remote signal device such as a key fob and/or from a selector located within the vehicle.

The controller selectively operates the liftgate to move the liftgate through multiple liftgate positions based upon signals such as those sent from a combination of key fob button presses and/or selector positions. The controller provides for the positioning of the liftgate at intermediate positions between fully open and a fully closed positions. Such additional positioning allows a user to avoid the somewhat time-consuming movement between the fully open and fully closed positions.

The present invention therefore provides a control system that selectively positions a vehicle liftgate.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
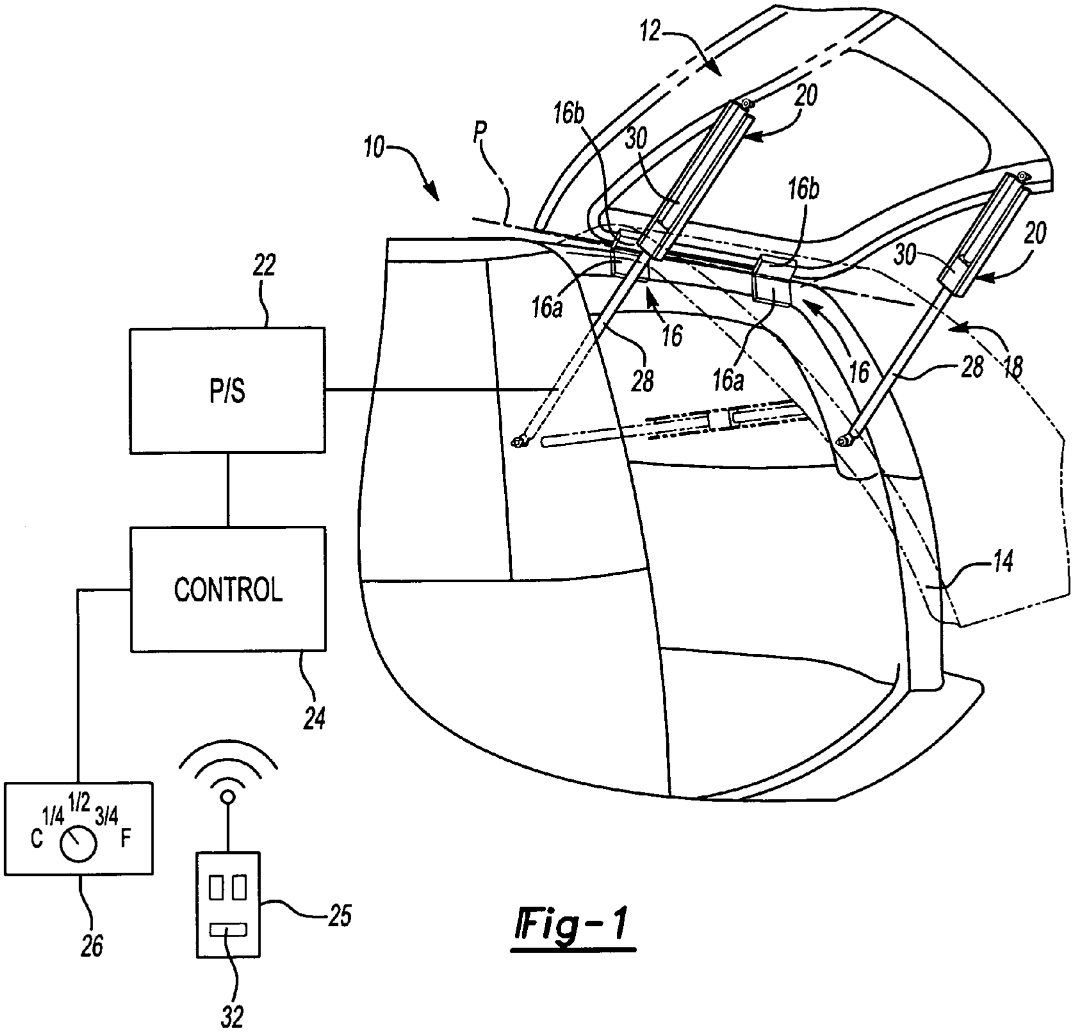
FIG. 1 is a general perspective view of a vehicle having a vehicle liftgate and a power operating system according to the present invention.

FIG. 1 illustrates a general perspective view of a vehicle 10 having a liftgate 12. Horizontal hinge assemblies 16 attach the liftgate of the vehicle 10. Although the liftgate disclosed in the illustrated embodiment is a single horizontal opening liftgate, it should be understood that other vans, station wagons, pick-up, and SUV movable closures will also benefit from the present invention. Moreover, other applications that require remote operation of a member will benefit from the present invention.

Hinge assemblies 16 have hinge portions 16*a* that are secured to the vehicle 10 and hinge portions 16*b* that are secured to the liftgate 12. Hinge portions 16*a* are attached to hinge portions 16*b* so that liftgate 12 pivots about a pivot axis indicated at P between a raised open position and a closed position. Pivot axis P is generally horizontal and liftgate 12 is generally permitted to pivot over 90 degrees.

The liftgate 12 is opened and closed between end positions by a powered system 18 that includes two actuators 20. The actuators 20 are laterally spaced from each other and near respective vertical body pillars 14 that define the rear opening closed by the liftgate 12. The actuators 20 are connected to a power supply (illustrated schematically at 22), such as a vehicle electrical system, and a controller (illustrated schematically at 24), such as a vehicle computer. The controller 24 preferably receives commands from a remote signaling device (illustrated schematically at 25), such as a key fob, and from a selector 26, which is preferably located within the vehicle. It should be understood that other selector devices, such as voice activation, scroll wheels, dials, buttons or the like, can be used with the present invention.

Each actuator 20 preferably includes a gas spring 28 and a linear electric motor 30 mounted thereto along a common axis. It should be understood that other powered struts, springs, and telescopic biasing members will benefit from the present invention. For further understanding of the actuator and associated components thereof, attention is directed to U.S. patent application Ser. No. 10/056,642, entitled "LINEAR ACTUATOR FOR A POWERED VEHICLE LIFTGATE," which is assigned to the assignee of the instant invention and which is hereby incorporated herein in its entirety.

The selector 26 is preferably a dial that provides for user input through rotation. A user selects a position for the liftgate 12 by rotating the dial. For example, the selector 26 may be provided with one-quarter, one-half, three-quarter, and fully open positions. Preferably, the dial provides infinitely variable positions between the fully closed and fully open positions. Such positions are achieved through the controller 24 by providing power to the linear electric motor 30 to achieve a selected position. It should be understood that other drive systems and positional lock arrangements will also benefit from the present invention.

Figure 2:
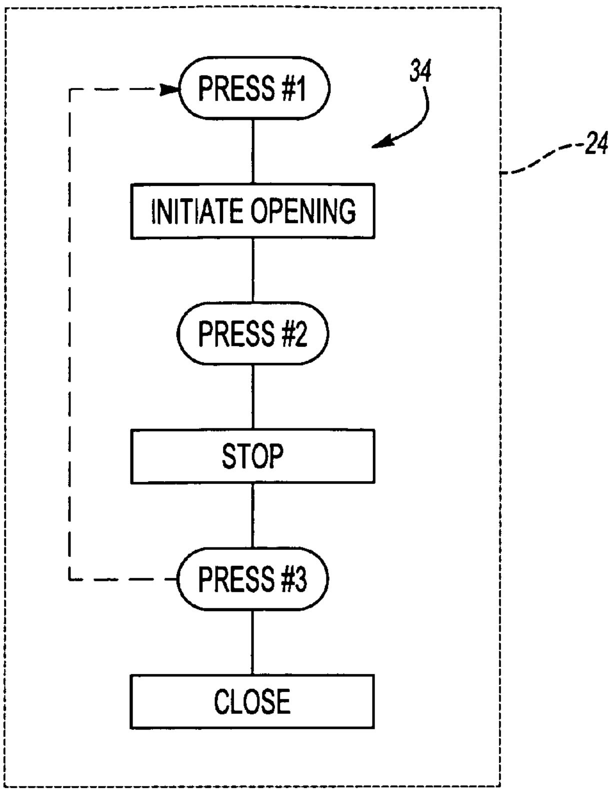
FIG. 2 is a block diagram of a liftgate control program.

Referring to FIG. 2, a flow chart illustrates a control program 34 for the liftgate 12. Because the remote signaling device 25 typically includes a single button 32 (FIG. 1) to operate the liftgate 12, the control program 34 positions the liftgate 12 through a combination of button presses. Preferably, a first press of the button 32 initiates opening of the liftgate 12. A second press of the button 32 stops the liftgate 12 in the current position. A third press of the button 32 begins closure of the liftgate 12. The next press will again initiate opening of the liftgate 12.

Figure 3:
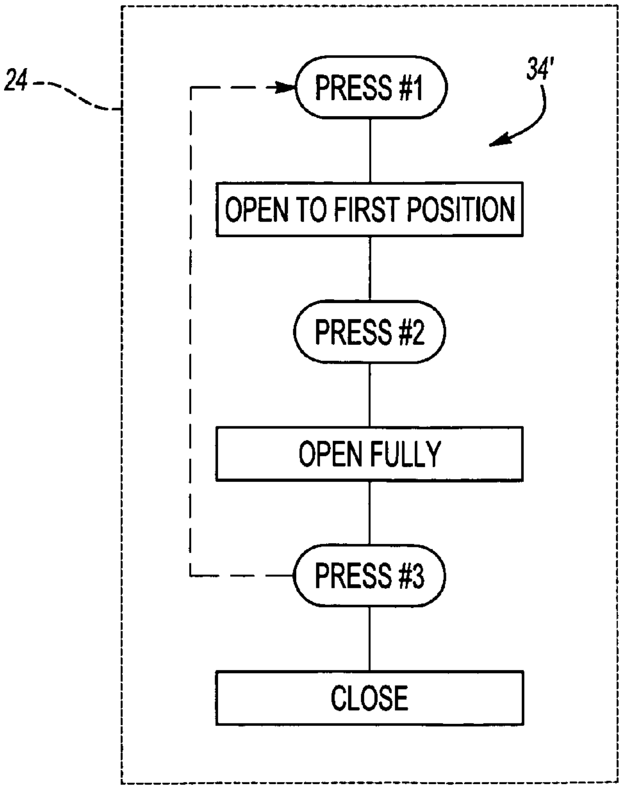
FIG. 3 is a block diagram of a liftgate control program.

Referring to FIG. 3, a flow chart illustrates another control program 34' for the liftgate 12. A first press of the button 32 initiates operation of the liftgate 12 to a predetermined position. A second press of the button 32 opens the liftgate 12 to a fully open position. A third press of the button 32 initiates closure of the liftgate 12. The next press will again initiate movement of the liftgate 12 to the predetermined position.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of operating a vehicle closure member comprising the steps of:

(1) providing a vehicle closure member movable between a fully open position and a fully closed position;

(2) communicating a first position command to the vehicle closure member to command the vehicle closure member to move the vehicle closure member directly to an intermediate position intermediate the fully open position and the fully closed position; and (3) selectively moving the vehicle closure member toward the intermediate position in response to the position command of said step (2).

2. A method as recited in claim 1, wherein said step (2) further comprises the step of:

wirelessly transmitting the position command.

3. A method as recited in claim 1, wherein said step (2) further comprises the step of:

communicating the position command in response to a rotational position of a dial selector.

4. A method as recited in claim 1, further comprising the steps of:

(4) communicating a close position command to the vehicle closure member; and (5) moving the vehicle closure member to the closed position in response to said step (4).

5. A method as recited in claim 1, further comprising the steps of:

(4) communicating an open position command to the vehicle closure member, and (5) moving the vehicle closure member to the open position in response to said step (4).

6. A method as recited in claim 1, further comprises the step of:

stopping the vehicle closure member at the intermediate poison.

7. A method as recited in claim 1, further comprising the steps of:

(4) communicating a second position command to the vehicle closure member after said step (3); and (5) moving the vehicle closure member toward the fully open position in response to said step (4).

8. A method as recited in claim 1, wherein said step (2) further comprises the step of:

wirelessly communicating the position command in response to a rotational position of a dial selector.

9. A method of operating a vehicle closure member comprising the steps of:

(1) communicating a first position command to a vehicle closure member movable between a first end position and a second end position;

(2) moving the vehicle closure member toward the first end position in response to said step (1);

(3) communicating a second position command after said step (2) but prior to the vehicle closure member reaching the first end position; and (4) stopping the vehicle closure member at an intermediate position intermediate the first end position and the second end position in response to the second position command in response to said step (3).

10. A method as recited in claim 9, further comprising the steps of:

(5) communicating a third position command; and (6) moving the vehicle closure member to the first end position in response to said step (5).

11. A method as recited in claim 9, further comprising the steps of:

(5) communicating a third position command; and (6) moving the vehicle closure member to the second end position in response to said step (5).

12. A powered system for a vehicle closure member comprising:

an actuator which drives a vehicle closure member movable between a fully open position and a fully closed position; and a controller in communication with said actuator, said controller operable to communicate a multiple of intermediate position commands to said actuator to selectively position said vehicle closure member to a multiple of corresponding intermediate positions intermediate said fully open position and said fully closed position in response to communication of one of said multiple of intermediate position commands.

13. The powered system as recited in claim 12, further comprising a remote signaling device that wirelessly communicates with said controller.

14. The powered system as recited in claim 12, further comprising a dial selector that communicates with said controller.

15. The powered system as recited in claim 12, wherein said actuator further comprises a gas spring selectively movable by a linear electric motor.

16. The powered system as recited in claim 15, wherein said gas spring and said linear electric motor are mounted along a common axis.

17. A vehicle closure member and associated system comprising:

a gas spring selectively movable by a linear electric motor to drive a vehicle closure member movable between a fully open position and a fully closed position;

a controller in communication with said linear electric motor; and a dial selector in communication with said controller, said controller operable to communicate a multiple of intermediate position commands to said linear electric motor to selectively position said vehicle closure member at one position of a multiple of corresponding intermediate positions intermediate said fully open position and said fully closed position in response to selection of said one position at said dial selector.

* * * * *

UNITED STATES PATENT AND TRADEMARK OFFICE

CERTIFICATE OF CORRECTION

PATENT NO. : 7,034,485 B2
APPLICATION NO. : 10/948908
DATED : April 25, 2006
INVENTOR(S) : Chihping Kuan et al.

It is certified that error appears in the above-identified patent and that said Letters Patent is hereby corrected as shown below:

Column 3, Line 59: Please delete “poison” and replace with --position--

Signed and Sealed this

Thirtieth Day of January, 2007

JON W. DUDAS
*Director of the United States Patent and Trademark Office*